May 13, 1941.    A. J. HOLMAN    2,241,403
OPTICAL ECONOMIZER
Filed Aug. 3, 1938    2 Sheets-Sheet 1

INVENTOR =
Arthur J. Holman.

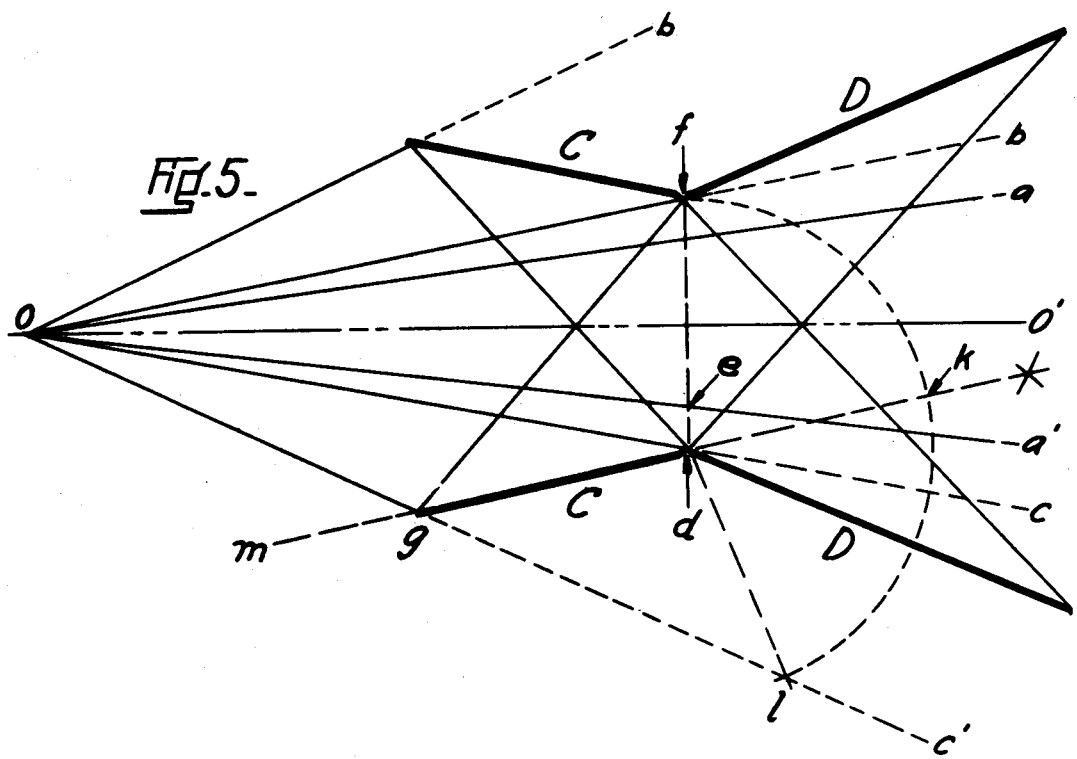
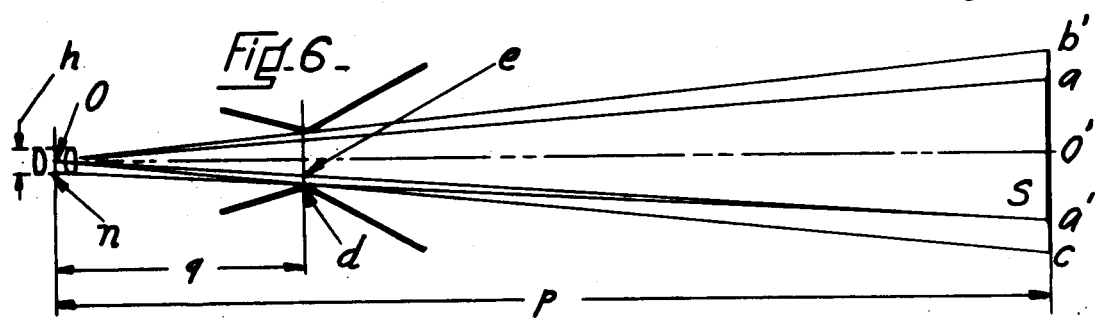
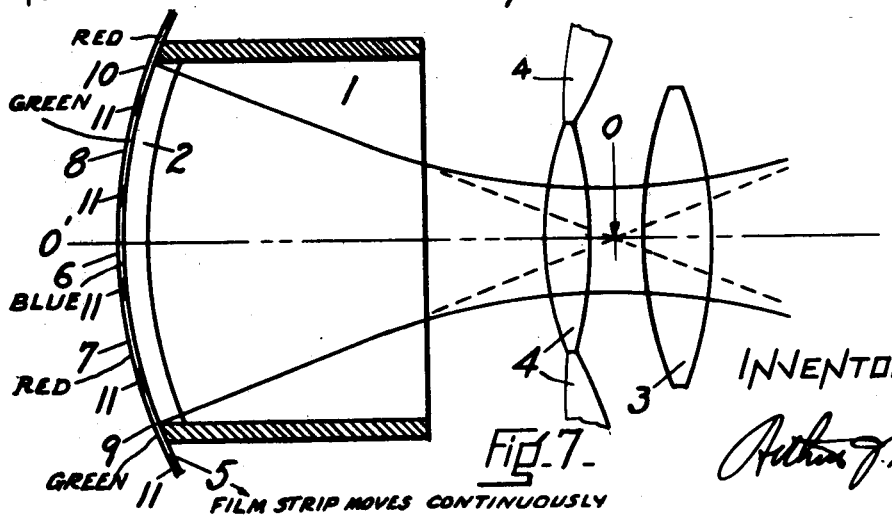

Patented May 13, 1941

2,241,403

UNITED STATES PATENT OFFICE 2,241,403

OPTICAL ECONOMIZER

Arthur J. Holman, East Orange, N. J.

Application August 3, 1938, Serial No. 222,797

17 Claims. (Cl. 88—16.4)

My invention relates to apparatus for projecting on a screen a composite action image comprising, at any instant, images of several regulation film frames, the individual frame images dissolving in and dissolving out of the composite action image without varying the luminosity of the composite image. Such composite action image can be created by a projector of the optical rectifying type capable of projecting simultaneously and without flicker well-defined undistorted images of several film frames, when such projector is used in combination with my present optical economizer. The function of the economizer is to register on the screen the multiple frame images emanating from the projector, which is preferably of the type described in Letters Patent of The United States No. 1,957,457 dated May 8, 1934. The present invention is principally an improved optical economizer and differs in several important respects from my former device disclosed in Letters Patent of The United States No. 1,989,094 dated January 29, 1935. Another item in this invention is an improvement in the projector aperture unit which eliminates certain defects formerly present in the composite action image when projecting in additive three color.

It has been the special object of my invention to so construct and so position the elements of my improved optical economizer that the image distortion caused by my former design may be completely neutralized. It has also been my object to determine and define the position wherein the device should be placed to provide that sharpness of image cut-off so essential to prevention of flicker in the composite action image, particularly along the upper and lower margins of the screen. Further objects have been to determine and use the smallest mirrors consistent with the requirements, also to eliminate certain undesirable multiple image effects caused by the use in my former device of improper mirrors, also to eliminate flicker when projecting the composite action image in additive three color. Other improvements over my former device will become apparent from the disclosures hereinafter set forth.

My invention may be best understood by reference to the accompanying drawings in which—

Fig. 5 illustrates a graphic method for determining proper angle for mirrors nearest the projector, also minimum length of these mirrors.

Fig. 6 is a diagram showing relation between objective opening, economizer position and frame line height.

Fig. 7 shows an aperture unit and optical rectifying system, and illustrates the position of film frames over the aperture when a rectifying lens element is centered on the optical axis.

Figure 1:
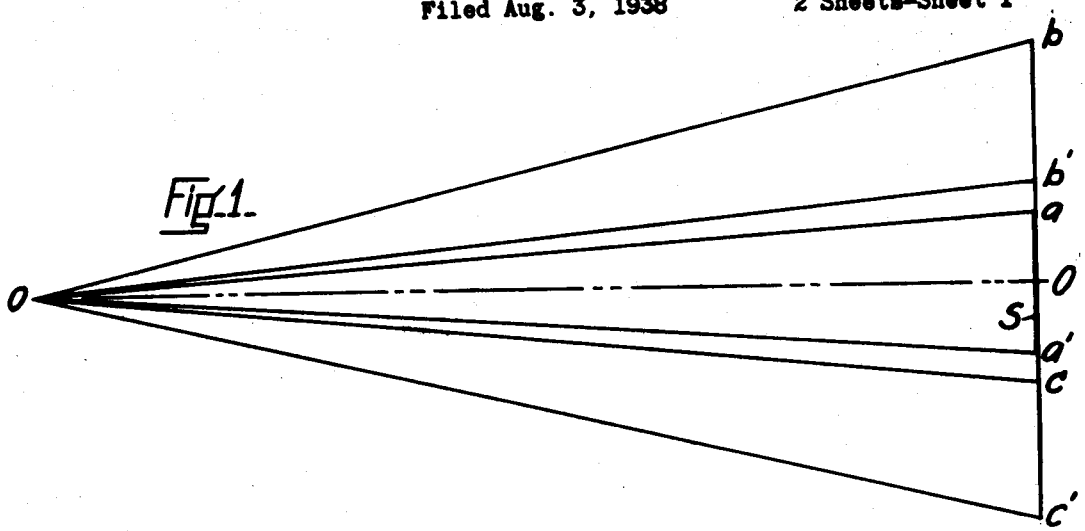
Fig. 1 is a diagram illustrating passage toward the screen of multiple image rays emanating from the projector.

Referring now more specifically to the drawings in which like letters and numerals indicate like parts, O represents the nodal point or equivalent center of the objective system (Fig. 1), O' is a second point on the optical axis and the lines $Oa$ and $Oa'$ represent, diagrammatically only, the boundary lines of the ray bundles comprising the central frame image projected to the screen S without deviation by the economizer mirrors. The lines $Ob$ and $Ob'$ likewise bound the ray bundles which would arrive above the screen S, and the lines $Oc$ and $Oc'$ bound the ray bundles which would arrive below screen S, were each of these groups of ray bundles not redirected by the economizer mirrors to the screen S. The boundary lines $Oa$, $Ob$, $Oc$ etc. do actually bound the various ray bundles comprising the separate frame images at and in the vicinity of the screen S, but at all other positions the ray bundles pass beyond their respective diagrammatic boundaries because the projector objective has a clear opening of considerable diameter whereas diagrams are drawn as if all rays transmitted by the objective were passed through a pin hole located at the nodal point O. The spaces $b'a$ and $a'c$ represent the height at screen S of the image of the film frame lines.

Figure 2:
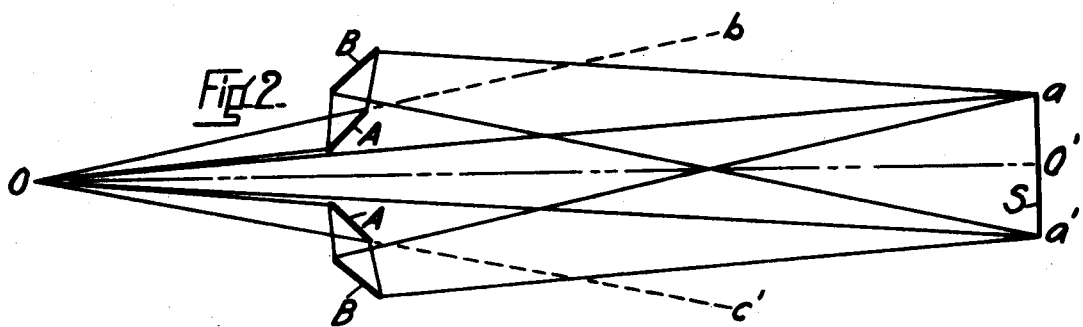
Fig. 2 is a diagram illustrating passage of multiple image rays to the screen with my former optical economizer.

Fig. 2 shows the effect on ray boundaries $bOb'$, $aOa'$ and $cOc'$ (Fig. 1) of inserting between nodal point O and screen S my former economizer wherein mirrors A are arranged to intercept ray bundles comprising the upper and lower frame images and to deflect them away from the optical axis O—O', and mirrors B are arranged to intercept these ray bundles a second time and to redirect them to screen S, at which plane $a$, $b$, and $c$ coincide, also $a'$, $b'$ and $c'$ coincide. In my Letters Patent for an optical economizer I pointed out that the opening between the centrally disposed mirrors A must be large with respect to the diameter of the objective lens and, furthermore, that the economizer must be placed several feet forward of the objective lens. It will be observed that the mirrors B are positioned considerably farther from the optical axis than the mirrors A; in fact mirrors B are located some distance outside the angle included within the broken lines $bO$ and $c'O$. Therefore, from the position of mirrors B the aspect of screen S is quite different from its aspect along the normal (optical axis) $O-O'$, more especially because the mirrors A and B are necessarily several feet from the nodal point O.

In my improved optical economizer the mirrors C (Fig. 3) are positioned to intercept the ray bundles comprising the upper and lower frame images and to deflect them toward the optical axis. Each of the mirrors D, coacting with a corresponding mirror C, is positioned across the optical axis from its coacting mirror C so as to intercept all ray bundles reflected by mirror C and to redirect them to the screen S. It is to be noted that the edge of each mirror C nearest to the optical axis $O-O'$ is the edge farthest from objective nodal point O, also that the edge of each mirror D nearest to the optical axis is spaced therefrom the same amount as the nearest edge of each mirror C, hence the aspect of screen S from mirrors D is very nearly the same as the aspect of the screen along the optical axis $O-O'$. This is the result of arranging mirrors C and D in V formation.

Figure 4:
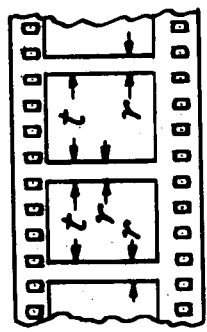
Fig. 4 shows the arrangement of film frames (pictures) and frame lines on a standard 35 mm. release print.

The position of the economizer with respect to the projector in my present apparatus, is determined partly by the dimensions of the film pictures and film frame line height. In Fig. 4, $t$ represents the height of a film picture and $r$ represents the height of a frame line. The point $d$ along the projected beam $Oc$ (Fig. 5) at which the forward edge of lower mirror C is to be located is determined as follows: It has been pointed out hereinbefore that the intercept $a'c$ of angle $a'Oc$ (Fig. 1) at the screen S represents the height of the frame line image at the screen. For any distance $Od$ (Fig. 5) from nodal point O, the intercept $de$ of angle $a'Oc$ in the plane at right angles to optical axis $O-O'$ represents, diagrammatically, the height of the frame line ray bundle at position $d$. The distance $de$ divided by the height $r$ (Fig. 4) of the frame line on the film gives the magnification ratio from the film to the most constricted portion (throat) of the economizer. For reasons hereinafter fully disclosed I prefer to locate my economizer at such position along the projected beam that intercept $de$ is equal to $h/2$ where $h$ is the height of the clear opening in the objective. The magnification ratio, film to most constricted portion or throat of economizer is, therefore, $h/2r$. The throat of economizer subtends at O the angle $b'Oc$ which includes the central frame image and two frame line images. In order words, the economizer throat passes ray bundles corresponding in height to film dimension $t+2r$ (Fig. 4). The actual dimension of the economizer throat is, therefore $(t+2r)$, multiplied by the magnification ratio $h/2r$, or $$\frac{h(t+2r)}{2r}$$

The distance from the nodal point O to the throat of the economizer, measured along the optical axis $O-O'$, is equal to the distance from the film to the nodal point O multiplied by the magnification ratio $h/2r$. For ordinary projection distances the spacing from film to nodal point O is slightly more than the equivalent focal length of the objective, hence the economizer throat is spaced from the nodal point O slightly more than the equivalent focal length of the objective multiplied by $h/2r$. In newly processed standard release prints on 35 mm. film $t$ is .60" and $r$ is .15" (very nearly), and if height $h$ of the clear opening in the objective is 2.4", the height of the opening through the economizer throat is then $$\frac{2.4(.60+2\times.15)}{2\times.15}$$

or 7.2". If the equivalent focal length of the objective is 5", the economizer throat is spaced from the nodal point approximately $$5\frac{2.4}{2\times.15}$$

or 40". To state the rule then: The economizer is placed at such position that its most constricted portion (throat) will just pass the projected beam $b'0c$ (central frame plus two frame lines); the minimum spacing between the mirrors C (Fig. 3), also between mirrors D, is $$\frac{h(t+2r)}{2r}$$

and the economizer is spaced from nodal point O, $h/2r$ multiplied by the distance from film to nodal point O.

The angular position of mirror C (Fig. 5) is determined graphically in the following manner. Just as the forward edge of lower mirror C is located at point $d$ on line $0c$ so also is the forward edge of upper mirror C located at the corresponding point $f$ on line $0b'$. The lower mirror C must intercept all rays within the angle $c0c'$, moreover the extreme lower ray $0c'$ when intercepted at $g$ by mirror C must be reflected through the opening $fd$ in order to reach upper mirror D the rear edge of which parallels the forward edge of upper mirror C and is spaced therefrom only enough to allow clearance for angular adjustment of the mirrors. From Fig. 5 it is obvious that mirror C will have the shortest length $dg$ when beam $0c'$ is reflected at $g$ and becomes beam $gf$. The problem is then, to determine point $g$ at which beam $0c'$ when reflected by mirror C becomes beam $gf$, and the solution is as follows. Using point $d$ as center and distance $df$ as radius strike the arc $fkl$ intersecting line $Oc'$ at $l$; bisect the angle $fdl$ with line $km$ passing through $d$ and interesecting line $Oc'$ at $g$. The law of reflection states that the angle of incidence $Ogm$ is equal to the angle of reflection $fgd$. Obviously angle $Ogm$ equals angle $dgl$. By construction, angle $dgl$ equals angle $fgd$, therefore $Ogm$ equals angle $fgd$ and the mirror C is the shortest mirror which will intercept all of the beam $cOc'$ and direct all the intercepted beam through the opening $fd$. Upper mirror C is, of course, set in a symmetrical position with respect to lower mirror C above the optical axis $O-O'$.

Figure 3:
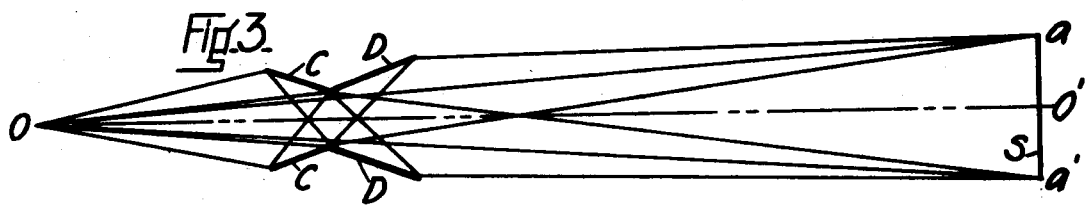
Fig. 3 is a diagram illustrating passage of multiple image rays to the screen with my present device wherein the pairs of mirrors are arranged in V-formation above and below the optical axis.

Lower mirrors C and D are preferably hinge mounted in V-formation on the axis $d$, likewise upper mirrors C and D are hinge mounted on axis $f$. Upper mirror D is positioned at such angle with respect to the optical axis $O-O'$ as to reflect beam $gf$ (Fig. 5) to the bottom edge of the screen, point $a'$ (Fig. 3). Mirrors C and D must, of course, be wide enough to intercept and deflect the full width, at the mirrors, of the projected beam, and, since mirror D is farther from the projector than mirror C, mirror D must be somewhat wider. The length of the mirrors is a function of the focal length of the objective; the shorter the focal length the shorter the mirrors, but mirrors will not vary greatly in length over the range of focal lengths found generally in theatres. When the objective focal length is 5", mirror C will be approximately 10" long (length gd Fig. 5) and mirror D will need to be about 15" long.

The mirrors are made preferably of heavy plate glass reground and highly polished on one side to a good optical flat and aluminized or otherwise made highly reflective on this surface. To avoid ghost images which would mar the composite action image, it is essential that first surface mirrors be used. Mirrors C and D must be so mounted and supported as to avoid strains that would warp the optical flat reflecting surfaces. Mirrors C and D are preferably beveled where their edges are adjacent (axes d and f Fig. 5) to minimize the clearance required for angular adjustment.

It has been stated hereinbefore that the economizer is located at such position along the projected beam that the intercept de, representing the height of the frame line band, is equal to h/2 or half the height of the clear opening in the objective. In Fig. 6, n is a point off the optical axis O—O' such that nO equals half the height h of the clear opening through the objective. Line Oea' represents a ray passing through nodal point O to the extreme lower edge of the screen. Obviously, light to the lower edge a' of the screen should also pass freely from point n representing the lowermost luminous area of the objective, but this is possible only if edge d of the economizer mirrors lies below line na'. If p is the projection distance and q is the economizer distance, both measured from nodal point O, we have then in triangle Oa'n $$\frac{nO}{de} = \frac{p}{p-q}.$$

But for ordinary theatre conditions q is quite small with respect to p, hence we have for all practical purposes, de equal to nO, which is the condition for prevention of flicker in the composite action image at the upper and lower margins of the screen.

In using my improved optical economizer in conjunction with the continuous projector described in Letters Patent No. 1,957,457 hereinbefore referred to, the composite action image is satisfactory and substantially flicker free when black and white or subtractive color prints, such as Technicolor, are being exhibited. The system also works well for two color additive prints having alternate frames dyed with the proper filter colors. However, when projecting three color additive prints whereon successive frames carry, in regular order, red, green and blue filters, I have found that white and unsaturated colors are rendered without noticeable flicker but areas of the screen whereon saturated primary colors appear show decided flicker. I have discovered the cause of this flicker resides in a certain eclipsing effect occurring at the aperture of the projector as a film frame enters upon and passes from a three frame aperture. In Fig. 7 is shown an aperture unit 1, having an aperture 2, which is four frames high. The stationary component of the objective is shown at 3 and one of the lens wheel elements 4 is shown centered on the optical axis O'—O. The lines converging from top and bottom of the aperture 2 toward lens wheel component 4 and then diverging through stationary component 3, represent the envelope of the beam projected through the aperture 2 by the condenser system, which is preferably of the type described in Letters Patent of the United States No. 2,150,165 issued March 14, 1939. The film overlying the aperture is represented at 5 and a film frame 6 is centered on the optical axis. Film frames 7 and 8 are also fully exposed over the aperture but frames 9 and 10 are partly eclipsed by the aperture unit. The black areas 11 represent frame lines separating the film picture areas. To avoid flicker over all areas in the composite action image, I have found aperture 2 must be of such height that incoming frame 10, advancing at uniform velocity, shall be fully exposed over aperture 2 before any part of frame 7 becomes eclipsed by the lower edge of aperture frame 1. This condition cannot obtain with an aperture which is less in height than four film picture areas plus three frame lines. With an aperture three frames in height there is a cyclic partial eclipsing of incoming and outgoing frames and, of course, the economizer cannot possibly deliver to the screen the color components essential to the composite action image when these components are not supplied by the projector.

The advantages of my present optical economizer are apparent from an examination of Figs. 2 and 3. Mirrors A in my former device deflect the upper and lower frame image rays away from the optical axis whereas mirrors C deflect these rays toward and across the optical axis. The mirrors B which are necessarily quite some distance from the optical axis, produce at the screen considerable keystone effect in the images which they direct to the screen. This keystoning of images is opposite in direction for upper and lower frame images and causes a lack of registration in the composite image which grows worse toward the corners of the screen. Another defect caused by this keystoning is an out of focus condition in the deflected images toward the upper and the lower margins of the screen. This is due to the difference in projection distance, via mirrors B, to the top and to the bottom of the screen. By arranging mirrors C and D in V-formation at substantially equal distances from the optical axis, the keystoning effect is greatly reduced. Moreover, by deflecting the upper and the lower frame images across the optical axis the keystoning effect of mirrors C is almost neutralized by mirrors D, hence registration in the composite action image is excellent even to the corners of the screen. The angular projection from mirrors D is only slightly different from the axial projection of the central frame image, hence the out of focus effect toward the top and bottom of the screen is not apparent. The present optical economizer combined with my single lens wheel projector having an aperture four frames in height, can create a highly satisfactory composite action image in natural color using a three color additive print whereon the filters are stained over the picture areas.

Having thus fully described my invention, what I claim is—

1. An optical economizer of the character specified comprising two pairs of mirrors, the first pair being positioned symmetrically adjacent the optical axis and adapted and arranged to deflect the upper and lower frame images in such manner that they will cross from a position above to a position below said optical axis or vice versa, the second pair of mirrors also being placed symmetrically adjacent the optical axis, edge to edge with said first pair of mirrors and at such angle thereto as to cause said upper and lower frame images to register on the screen.

2. An optical economizer of the character specified comprising two pairs of mirrors arranged symmetrically in V-formation, one pair above and one pair below the optical axis, the V-edges being opposite and equally spaced from said optical axis, the angle between the mirrors nearest the projector being such as to cause the upper and lower image ray bundles to pass between said pairs of mirrors arranged in V-formation, and the angle between the mirrors farthest from the projector being such as to cause the upper and lower images to register on the screen with the central image.

3. An optical enonomizer of the character specified comprising two pairs of mirrors positioned symmetrically above and below the optical axis and adapted and arranged to constrict the multiple image ray bundles to the central passage through said economizer, said central passage being of such height as to pass the central ray bundle comprising the central frame image plus a frame line above and a frame line below said central frame image.

4. An optical economizer of the character specified comprising two pairs of mirrors arranged symmetrically in V-formation, one pair above and one pair below the optical axis, the most constricted passage between said pairs of mirrors being equal in height to a film picture and two frame lines multiplied by the magnification ratio from film frame to economizer, said most constricted passage being spaced from the objective nodal point by an amount equal to the distance from nodal point to film multiplied by said magnification ratio.

5. An optical economizer of the character specified comprising two pairs of mirrors arranged symmetrically in V-formation, one pair above and one pair below the optical axis, the most constricted passage between said pairs of mirrors subtending an angle at the objective nodal point including ray bundles comprising the central frame image plus two frame lines, said most constricted passage being spaced from said nodal point by an amount equal to the distance between film and objective nodal point multiplied by one half the height of the clear opening through the objective and divided by the height of a film frame line.

6. An optical economizer of the character specified comprising two pairs of mirrors arranged symmetrically in V-formation, one pair above and one pair below the optical axis, the most constricted passage between said pairs of mirrors having a height equal to the height of a film picture and two frame lines multiplied by one half the height of the clear opening through the objective and divided by the height of a film frame line, said most constricted passage being spaced from the objective nodal point by an amount equal to the distance between film and nodal point multiplied by one half the height of the clear opening through the objective and divided by the height of a film frame line.

7. An optical economizer of the character specified comprising two pairs of mirrors arranged symmetrically in V-formation, one pair above and one pair below the optical axis, the mirrors nearest the projector being positioned at such angle to said optical axis as to cause the extreme upper beam of the upper frame image and the extreme lower beam of the lower frame image to just graze the mirror edges nearest to said optical axis, the mirrors farthest from said projector being adapted and arranged to direct all light coming from said mirrors nearest the projector to the screen and in register with the central frame image.

8. An optical economizer of the character specified comprising two pairs of mirrors positioned symmetrically in V-formation, one pair above and one pair below the optical axis, the mirrors nearest the projector being adapted and arranged to intercept the upper and lower frame image rays, the angle and spacing between these mirrors being such as to cause the reflected ray bundles from each mirror to just fill the most constricted passage between said mirrors, and the mirrors farthest from the projector each being adapted and aranged to intercept all reflected rays from its particular film frame and to redirect them to the screen in register with the central frame image.

9. An optical economizer of the character specified comprising two pairs of first surface mirrors arranged symmetrically about the optical axis in V-formation, said mirrors being proportioned and positioned forward of the objective nodal point to cause all reflected ray bundles to cross from a position above to a position below said optical axis or vice versa, and to register on the screen with the central frame image projected through said economizer without reflection.

10. An optical economizer of the character specified comprising two pairs of first surface mirrors arranged symmetrically about the optical axis in V-formation, said mirrors being proportioned and positioned forward of the objective nodal point to intercept all upper and lower frame image ray bundles, to reflect them through the opening between the mirrors traversed by the central frame image and to register the upper and lower frame images on the screen with said central frame image.

11. In combination, a projector of the optical rectifying type having an aperture four frames in height, a film strip moving continuously over said aperture, and an optical economizer of the character specified, said economizer comprising two pairs of mirrors arranged symmetrically in V-formation forward of the objective nodal point, one pair above and one pair below the optical axis, and adapted to register continuously on the screen uneclipsed images of three full film frames.

12. In combination, a projector of the optical rectifying type having an aperture four frames in height, a film strip of the three color additive type having filters stained in the film frames and moving continuously over said aperture, and an optical economizer of the character specified, said economizer comprising two pairs of mirrors arranged symmetrically in V-formation forward of the objective nodal point, one pair above and one pair below said optical axis, and adapted to register continuously on the screen true color values recorded in the film without cyclic eclipse of saturated primary colors.

13. In combination, a projector of the optical rectifying type having an aperture four frames in height, a film strip of the three color additive type having filters stained in the film frames and moving continuously over said aperture, and an optical economizer of the character specified comprising two pairs of first surface mirrors arranged symmetrically about the optical axis in V-formation forward of the objective nodal point, said mirrors being proportioned and positioned to intercept all upper and lower frame image ray bundles, to reflect them through the opening between the mirrors traversed by the central frame image and to register said upper and lower frame images on the screen with said central frame image, thereby recreating continuously on the screen an image possessing the composite color values recorded on the film.

14. An optical economizer positioned forward of the objective nodal point and arranged to register multiple frame images on a screen in the manner specified, said optical economizer comprising two pairs of mirrors positioned symmetrically about the optical axis and arranged to neutralize the keystone effect in the reflected images by causing all ray bundles deviated by said mirrors to cross from positions above to positions below said optical axis, or vice versa.

15. An optical economizer positioned forward of the objective nodal point and arranged to register multiple frame images on a screen in the manner specified, said optical economizer comprising two pairs of mirrors, the mirrors of a coacting pair being positioned one above and one below the optical axis to neutralize the keystone effect in the reflected images by causing all deviated ray bundles to cross from positions above to positions below said optical axis, or vice versa.

16. An optical economizer positioned forward of the objective nodal point and arranged to register multiple frame images on a screen in the manner specified, said optical economizer comprising two pairs of mirrors arranged symmetrically in V-formation, one pair above and one pair below the optical axis, said pairs of mirrors being spaced from each other and from the objective nodal point in a manner whereby mirrors of the smallest dimensions may be used without causing any luminous area of the objective to be eclipsed by the economizer over any area of the screen.

17. An optical economizer positioned forward of the objective nodal point and arranged to register multiple frame images on a screen in the manner specified, said optical economizer comprising two pairs of mirrors positioned adjacent the optical axis and arranged to minimize the difference in projection distance via said mirrors from nodal point O to the top and to the bottom of the screen by directing the central rays of each film frame toward the optical axis whenever said rays are reflected.

ARTHUR J. HOLMAN.